United States Patent
Sugitani

[11] Patent Number: 6,131,991
[45] Date of Patent: Oct. 17, 2000

[54] WIRE HARNESS LAYOUT ARRANGEMENT FOR AUTOMOBILE BACK DOOR

[75] Inventor: Susumu Sugitani, Yokkaichi, Japan

[73] Assignee: Sumitomo Wiring Systems, Ltd., Yokkaichi, Japan

[21] Appl. No.: 09/398,141

[22] Filed: Sep. 17, 1999

[30]     Foreign Application Priority Data

Sep. 17, 1998   [JP]   Japan ................................... 10-263648

[51] Int. Cl.[7] ....................................................... B60J 5/10
[52] U.S. Cl. ........................................ 296/208; 296/146.8
[58] Field of Search ................................. 296/208, 146.8, 296/56, 106; 174/48, 49

[56]                References Cited

U.S. PATENT DOCUMENTS

| D. 231,769 | 6/1974 | Searer et al. . |
| 1,772,687 | 8/1930 | Reinke . |
| 1,905,794 | 4/1933 | Burke . |
| 2,283,398 | 5/1942 | Van Deventer . |
| 2,441,461 | 5/1948 | Wayne . |
| 3,626,082 | 12/1971 | Kasai ..................... 174/72 R |
| 4,248,459 | 2/1981 | Pate et al. ................. 285/319 |
| 5,678,877 | 10/1997 | Nishijima et al. ......................... 296/70 |
| 6,003,931 | 12/1999 | Dancasius et al. ................... 296/146.8 |

FOREIGN PATENT DOCUMENTS

| 0275575 | 7/1988 | European Pat. Off. . |
| 4324466 | 1/1995 | Germany . |
| 2-37514 | 3/1990 | Japan . |
| 6-32148 | 2/1994 | Japan . |
| 10-126928 | 5/1998 | Japan . |
| 10-126929 | 5/1998 | Japan . |
| 10-236166 | 9/1998 | Japan . |

OTHER PUBLICATIONS

An English Language abstract of JP 10–126928, May 15, 1998.
An English Language abstract of JP 10–236166, Sep. 8, 1998.
An English Language abstract of JP 6–32148, Feb. 8, 1994.
An English Language abstract of JP 10–126929, May 15, 1998.

Primary Examiner—D. Glenn Dayoan
Assistant Examiner—Mickki D. Murray
Attorney, Agent, or Firm—Greenblum & Bernstein, P.L.C.

[57]                ABSTRACT

There is provided an arrangement for preventing a wire harness, which is laid along the frame provided around a rear window glass, from projecting over the glass insertion side and into a glass insertion area of the door. At arc-shaped portions of the frame, arc-shaped guide components, such as a guide bar, a guide tube, etc., are attached to the wire harness laid along the frame provided around the rear window glass of the back door for automobile. The guide bar may be formed of a resin, including polyamide, polypropylene, nylon, vinyl chloride, etc., and the guide tube may be suitably formed of polyethylene. Clamps are attached to the wire harness at linear portions of the frame, and then the clamps are inserted into clamp holes provided in the frame and anchored thereat, thereby preventing the wire harness from projecting over the frame and into a glass insertion area of the door.

20 Claims, 5 Drawing Sheets

WIRE HARNESS LAYOUT ARRANGEMENT FOR AUTOMOBILE BACK DOOR

BACKGROUND OF THE INVENTION

1. Field of the Invention

The present invention relates to a layout structure of a wire harness on the back door for an automobile, and particularly for preventing a wire harness laid from a roof side to a frame set around a rear window from projecting over the frame and into a glass insertion area of the door.

2. Description of Background Information

A wire harness that supplies a power source to a wiper, a license plate illuminator, a defogger, etc., is laid from a roof side along the frame around a rear window.

Figure 8:
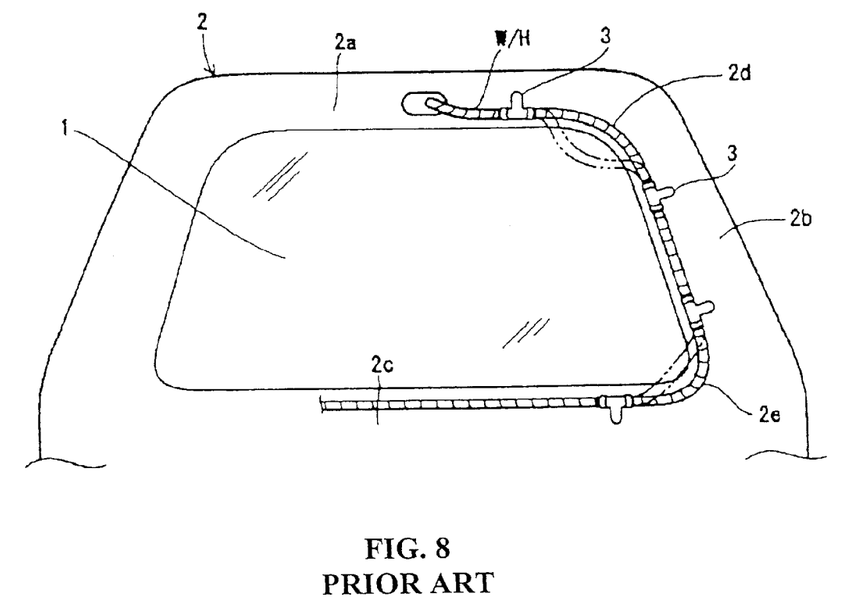
FIG. 8 is a front view showing an example of the prior art.

That is, as shown in FIG. 8, a wire harness W/H is taken out from a roof side to the middle portion of the upper frame 2a of the frame 2 where a rear window glass is inserted, and from this position via either side of an upper frame 2a and either of side frames 2b is laid to the middle portion of the lower frame 2c. At this position, the wire harness is connected to a wiper motor, etc.

On the wire harness to be laid along the frame 2, clamps 3 are fixed by taping or by binding with a band. The clamps 3 are inserted into clamp holes provided through the frame 2 and are anchored thereat. The wire harness W/H is thus fixed along the edge of the frame 2, into which a rear window glass is inserted.

The anchoring positions of the clamps 3 on the frame 2 are on flat surface portions of the frame, where holes for the clamps can be made possible. However, at the arc-shaped corner portion that continues from the upper frame 2a to the side frame 2b and at the arc-shaped corner portion that continues from the side frame 2b to the lower frame 2c, clamp holes cannot be provided. Therefore, the clamps cannot be used for fixing the wire harness W/H at these positions.

Due to the above situation, the likelihood exists that the portion of the wire harness positioned along the arc-shaped upper corner portion will hang down, as shown in FIG. 8 with broken lines. Further, at the arc-shaped lower corner portion the wire harness W/H cannot be made precisely parallel with the frame.

As described above, after laying the wire harness W/H on the frame 2, the insertion work of a rear window glass 1 into the frame 2 is performed. At that time, if the wire harness W/H hangs down from the arc-shaped upper portion, there is a problem that at the time of glass insertion work, the wire harness may be pinched between the frame and the glass with the result that the glass insertion work cannot be performed smoothly. After inserting a rear window glass into the frame, a trim covers the frame 2 (not shown in the drawing) and the wire harness is supported between the frame and the trim. However, when inserting glass, the positioning of the wire harness cannot be fixed at that time, and thus the above problem arises.

The present invention is made in consideration of the above problem. The aim of the present invention is to lay out the wire harness such that it does not project over the frame and into a glass insertion area of the door, thereby preventing it from interrupting the glass insertion work and, hence, enhancing the work efficiency.

SUMMARY OF THE INVENTION

In order to solve the above problem, the present invention provides a layout device for a wire harness on a back door of an automobile, with the wire harness laid along a frame provided around a rear window of the back door. At arc-shaped portions of the frame, arc-shaped guide components are attached to the wire harness to cause the wire harness to extend parallel to the arc-shaped portions of the frame, and at linear portions of the frame, clamps are attached to the wire harness, and then the clamps are inserted into clamp holes provided through the frame and anchored thereat, thereby preventing the wire harness from projecting over the frame.

The guide components may be configured as a guide bar, a guide tube, etc. The guide bars and the guide tubes are pre-formed to have arc-shapes complementary to the arc-shapes of the frame.

The guide bars and guide tubes are formed from any suitable material, and particularly from a noncombustible resin. The guide bar may be made of polyamide, polypropylene, nylon, vinyl chloride, etc., and the guide tube may be suitably formed of polyethylene with slits provided therein.

Both ends of the above guide bars or guide tubes preferably extend to the flat surface of the frame where clamp holes can be provided, and the ends are fixed and anchored to the frame by attaching clamps to both ends. Further, the clamps are not necessarily attached to both ends of guide bars or the guide tubes. Alternatively, the clamps may be attached to only one of the ends, or clamps may be attached to neither end of the guide bars or guide tubes.

The wire harness is laid from a roof side to the middle portion of an upper frame of the frame, then from the middle portion of the upper frame along either of the side frames to the middle portion of a lower frame, and at arc-shaped corners where an upper frame and a lower frame connect with a side frame, respectively, the wire harness is forced to conform to the arc shapes of the frame by the guidance of the guide components.

By attaching guide components, such as guide bars, guide tubes, and the like to the wire harness and forming the guide components to conform to the arc shapes of the frame, the wire harness is prevented from projecting over the frame toward the glass insertion side. Therefore, when inserting glass into the frame, the wire harness does not interfere with the installation which would lower the installation efficiency.

Further, the layout device for a wire harness of the present invention can be employed not only for a back door type, but also for a sedan type when layout of the wire harness is needed around a rear window.

According to another aspect of the present invention, a wire harness layout arrangement is provided for an automobile back door having a wire harness laid along a frame, the frame having arc-shaped portions around a rear window of the back door. The arrangement includes at least one arc-shaped guide component provided at at least one arc-shaped portion of the frame and attached to the frame, and the guide component is configured to follow the arc-shaped portions of the frame. A plurality of clamps are attached to the wire harness at linear portions of the frame, the clamps being insertable into clamp holes provided in the frame and anchorable thereat, and the arrangement thereby prevents the wire harness from projecting over the frame.

In other aspects of the wire harness layout arrangement of the present invention, the at least one guide component may be formed from an arc-shaped guide bar. Alternatively, the guide component may be formed from an arc-shaped guide tube, and the tube may include a longitudinal slit to permit insertion of the wire harness therein. The guide bar may be formed of a resin, including polyamide, polypropylene, nylon, vinyl chloride, etc., and the guide tube may be suitably formed of polyethylene.

In another aspect of the wire harness layout arrangement according to the present invention, the wire harness is laid from a roof side to a middle portion of an upper frame portion of the frame, then from the middle portion of the upper frame portion along either side frame portion to a middle portion of a lower frame portion, and, at an arc-shaped corner portion where an upper frame portion and a lower frame portion connect with a side frame portion respectively, the wire harness is forced to conform to an arc shape of the frame by the guidance of the guide component.

Another aspect of the present invention includes, the combination of a wire harness for an automobile back door, the wire harness being laid along a frame, the frame having arc-shaped portions around a rear window of the back door, and a wire harness layout arrangement including at least one arc-shaped guide component provided at at least one arc-shaped portion of the frame and attached to the frame, with the guide component configured to follow the arc-shaped portions of the frame. At least two clamps are attached to the wire harness at linear portions of the frame, the clamps being insertable into clamp holes provided in the frame and anchorable thereat, such that the arrangement thereby prevents the wire harness from projecting over the frame.

The combination wire harness and layout arrangement according to the present invention may also include the guide component formed from an arc-shaped guide bar. Additionally, the guide component may be formed from an arc-shaped guide tube, and the tube may include a longitudinal slit to permit insertion of the wire harness therein. The guide bar may be formed of a resin, including polyamide, polypropylene, nylon, vinyl chloride, etc., and the guide tube may be suitably formed of polyethylene.

In a further aspect of the present invention, the combination wire harness and layout arrangement may include a first end of the at least one arc-shaped guide component is positioned intermediate at least one of the clamps and the wire harness at a first location, and a connecting member securing the first end of the at least one arc-shaped guide component, the at least one clamp, and the wire harness together at the first location. Alternatively, a second end of the at least one arc-shaped guide component may be positioned intermediate a second clamp and the wire harness at a second location, and a connecting member secures the second end of the at least one arc-shaped guide component, the second clamp, and the wire harness together at the second location. In a still further embodiment, a first end of the at least one arc-shaped guide component is positioned intermediate at least one of the clamps and the wire harness at a first location, and a first connecting member secures the first end of the at least one arc-shaped guide component, the at least one clamp, and the wire harness together at the first location, and a second connecting member secures the second end of the guide component directly to the wire harness without a clamp being secured to the second end.

In a further aspect of the present invention, a wire harness layout arrangement is provided for an automobile back door having a wire harness laid along a frame, the frame having arc-shaped portions around a rear window of the back door. The arrangement includes at least one arc-shaped guide component provided at at least one arc-shaped portions of the frame and attached to the frame, with the guide component configured to follow the arc-shaped portions of the frame. The at least one clamp is attached to the wire harness at linear portions of the frame, and the at least one clamp is insertable into respective clamp holes provided in the frame and anchorable thereat, such that the arrangement thereby prevents the wire harness from projecting over the frame.

The wire harness layout arrangement for an automobile back door may also include the at least one guide component formed from an arc-shaped guide bar. Alternatively, the at least one guide component may be formed from an arc-shaped guide tube, and the tube may include a longitudinal slit to permit insertion of the wire harness therein. The guide bar may be formed of a resin, including polyamide, polypropylene, nylon, vinyl chloride, etc., and the guide tube may be suitably formed of polyethylene.

In still another aspect of the present invention, the wire harness layout arrangement is configured such that the wire harness is laid from a roof side to a middle portion of an upper frame portion of the frame, then from the middle portion of the upper frame portion along either side frame portion to a middle portion of a lower frame portion, and, at an arc-shaped corner portion where an upper frame portion and a lower frame portion connect with a side frame portion respectively, such that the wire harness is forced to conform to an arc shape of the frame by the guidance of the at least one guide component.

BRIEF DESCRIPTION OF THE DRAWINGS

The above and other feature and advantages of the present invention will be made apparent from the following description of the preferred embodiments, given as nonlimiting examples, with reference to the accompanying drawings in which.

DETAILED DESCRIPTION OF THE PREFERRED EMBODIMENTS

Figure 1:
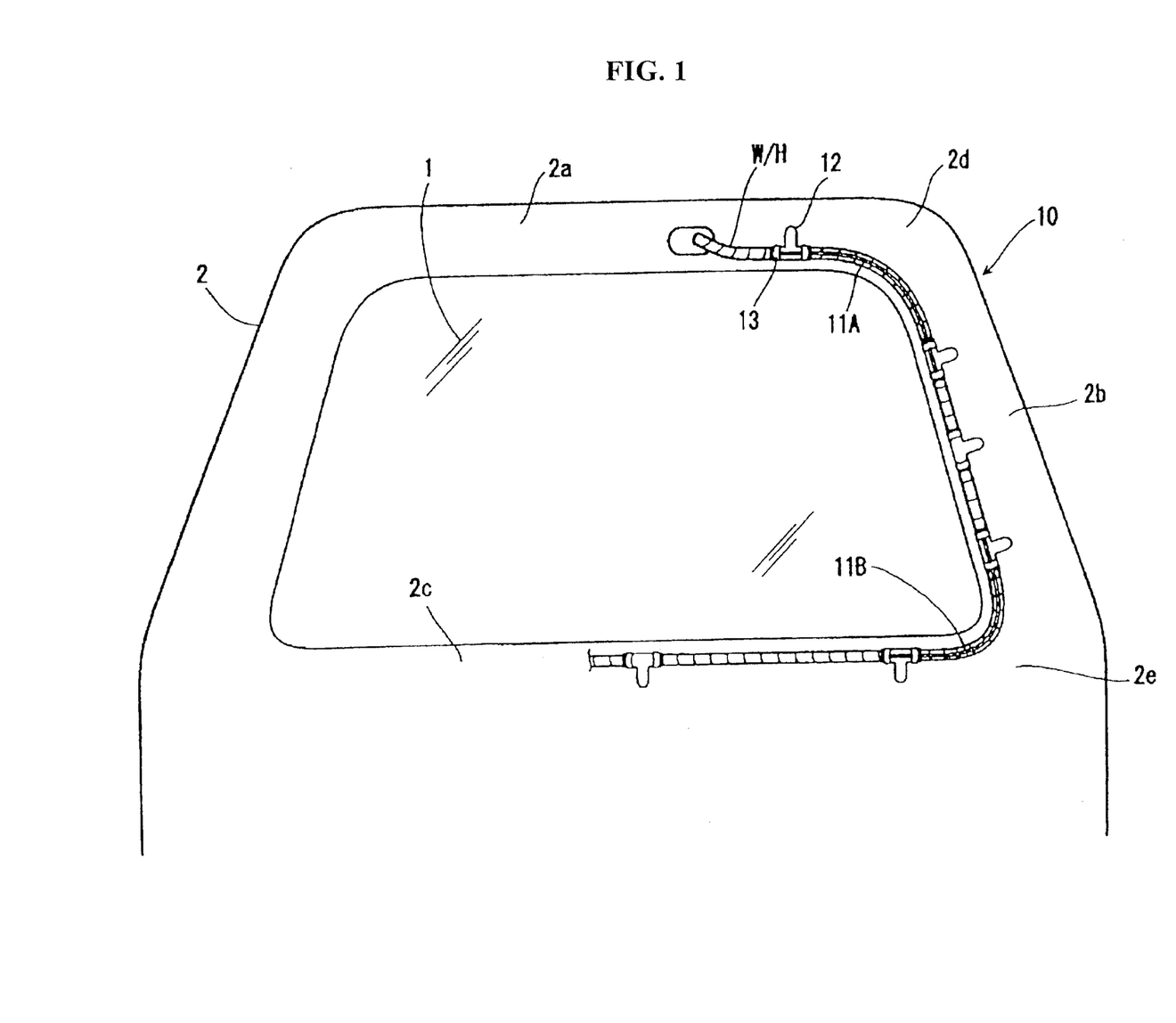
FIG. 1 depicts a front view showing a first embodiment of the present invention.
Figure 2:
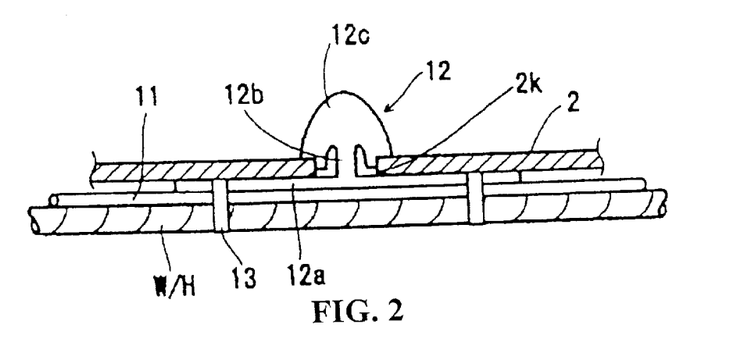
FIG. 2 depicts an enlarged partial sectional view of FIG. 1.

Hereinafter, description of the embodiments of the present invention follows with reference to the drawings. FIG. 1 and FIG. 2 show a first embodiment of the present invention. Hinges (not shown) connect the upper side of a back door 10 for an automobile to the roof (not shown in the figure), and the back door is the type to be opened upwardly. Therefore, a wire harness, which supplies power to a wiper, a license plate lamp, a defogger, etc. mounted on the back door, is positioned from the roof side at the middle portion of the upper frame 2a in the frame 2 of the back door, and then from the middle portion of the upper frame to the middle portion of the lower frame along either of the side frames. The corner portion with which the upper frame 2a of the frame 2 and the side frame 2b are connected continually forms an arc-shaped corner 2d, and the corner portion with which the side frame 2b and the lower frame 2c are connected continually forms an arc-shaped corner 2e.

At the areas overlying the arc-shaped corner portions 2d, 2e, guide bars 11A and 11B are provided to guide the wire harness W/H, and clamps 12 are attached at opposite ends of the guide bars 11A and 11B, respectively. Each clamp 12 is fixed by wrapping the tape 13 over the guide bar 11A (11B) and the wire harness W/H. That is, the guide bar 11A (11B) and the clamp 12 are fixed to the wire harness simultaneously by binding together with the tape.

Figure 7A:
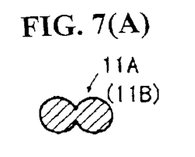
FIG. 7(A) and FIG. 7(B) are cross sectional views of other examples of resin bars used for guiding the wire harness in accordance with the present invention.
Figure 7B:
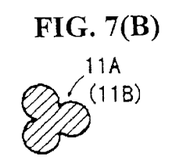

The guide bars 11A and 11B are pre-formed to have arc shapes to follow that of the glass insertion side edge of the frame 2, and the both ends extend to the positions on which the surface of the frame 2 becomes flat, where provision of the clamp holes 2k through the frame 2 becomes possible. Concretely, each guide bar is configured as a generally round bar having a diameter of about 3 to 5 mm and a length of about 30 cm. Further, the guide bar is not limited to having a round cross section, but may have any suitably shaped cross-section. As shown in FIG. 7(A) a twin-shape including two bars may be used or, as shown in FIG. 7(B), a triple-shape including three bars may be used. In the case of the twin-shape or the triple-shape, the combined width thereof will preferably be about 10 mm, but they may have any suitable size as deemed necessary.

The clamp 12 as shown in FIG. 2, has a shape for general use and includes a base plate 12a, an axial portion 12b that projects from the base plate and a wing-shaped anchoring portion 12c continually connected to the axial portion. By only inserting the anchoring portion into a clamp hole 2k, the clamp is fixed and anchored thereat.

The guide bars for 11A and 11B are fixed on the wire harness together with clamps 12, and are laid along the frame 2. The clamps 12 are inserted into the clamp holes 2k and fixed thereat. As shown in FIG. 1, the wire harness W/H is retained at the correct position along the inner circumferential edge of the frame 2. Therefore, the wire harness is prevented from dangling from the frame 2 over the window glass insertion side or projecting out over the frame. As a result, at the time of inserting the rear window glass into the frame, the wire harness W/H will not be pinched therebetween. Thus, the glass insertion work can be performed smoothly and efficiently.

Figures 3A, 3B:
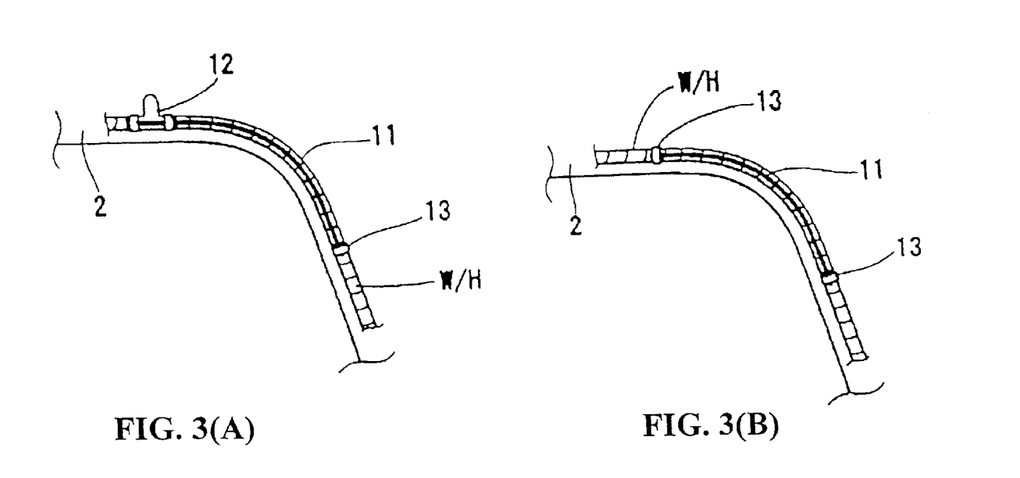
FIG. 3(A) and FIG. 3(B) are schematic depictions of other examples of the first embodiment.

FIGS. 3(A) and 3(B) show other examples of the clamp attaching position. FIG. 3(A) shows an example of a clamp 12 attached onto only one end of the guide bar 11 and both the guide bar 11 and a clamp 12 being fixed to the wire harness by the tape 13. The other end of the guide bar 11 is fixed to the wire harness W/H only by the tape 13, without attachment to a clamp. FIG. 3(B) shows another example, wherein both ends of the guide bar 11 are fixed to the wire harness W/H by only binding the tape 13, without attachment of any clamps to the wire harness. As explained above, as the guide bar 11 is pre-formed to have an arc shape that follows the shape of the corners of the frame, it is possible to adjust the shape of the wire harness W/H to an arc shape by only attaching the guide bar to the wire harness by the tape 13. Thus, it is not always necessary to maintain the proper position by fixing both ends of the guide bar by use of the clamps 12.

Figure 4:
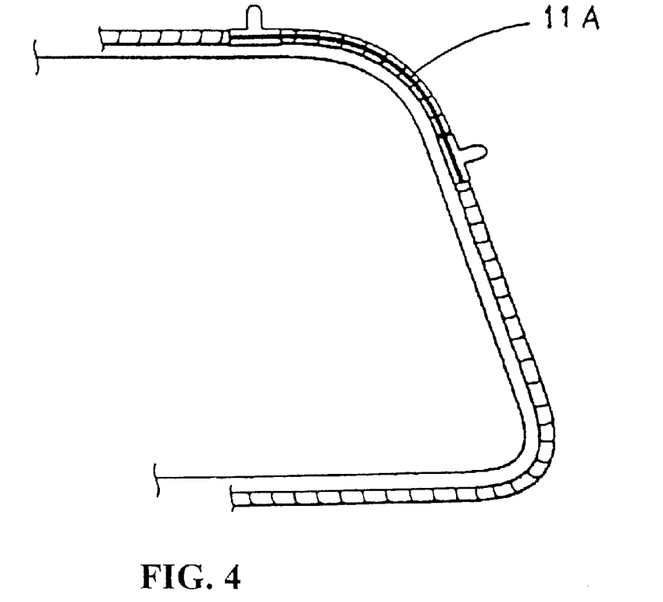
FIG. 4 is a schematic depiction of another example of the first embodiment.

FIG. 4 shows another example of the attaching position of the guide bar. The guide bar 11A is attached at arc-shaped corner portions of the upper side of the frame 2 only. The guide bar 11B at the lower side is not used. That is, the wire harness W/H is more likely to hang down and to project over the glass insertion side at the arc-shaped corner portions 2d of the upper side, whereas at the arc-shaped corner portions 2e of the lower side, the likelihood of the wire harness projecting over the glass insertion side is less. Thus, omitting a guide bar at the lower corner location may well be justified.

Figure 5:
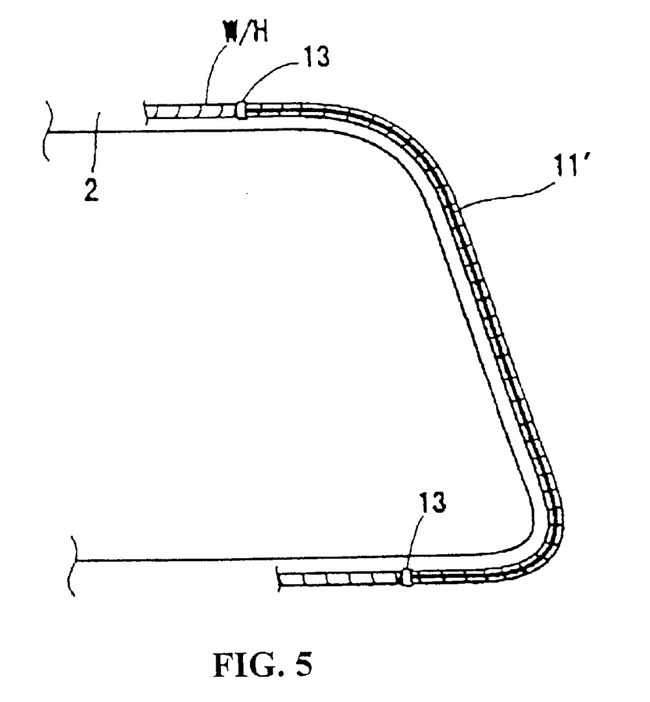
FIG. 5 is a schematic depiction of a second embodiment of the present invention.

FIG. 5 shows the second embodiment of the present invention. The guide bars 11A and 11B are incorporated into a single continuous guide bar 11'. The guide bar 11' guides the wire harness W/H from the upper side arc-shaped corner portion to the lower side arc-shaped corner portion along the side frame 2b, thereby causing the wire harness to follow the shape of the frame.

Figure 6:
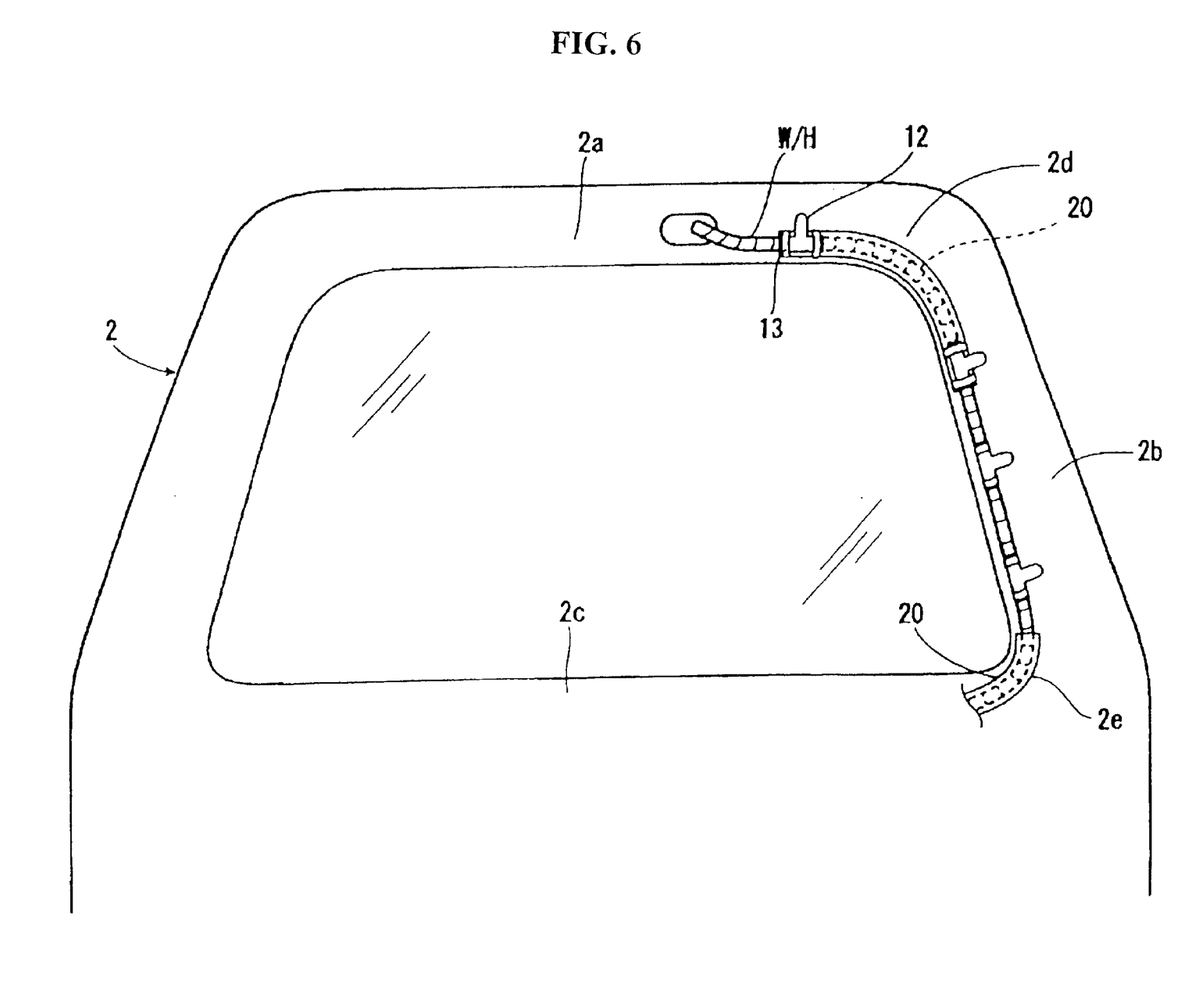
FIG. 6 depicts a front view of a third embodiment of the present invention.

FIG. 6 shows the third embodiment of the present invention. In order to cause the wire harness W/H to follow the shape of the frame 2, a guide tube 20 is used in place of the guide bar. The guide tube 20 covers the wire harness W/H. A slit is provided in guide tube 20, which makes it possible to cover the wire harness from a direction perpendicular to the axis of the wire harness while allowing the tube to be easily bent, thereby causing the wire harness to follow the arc-shaped corner portions 2d and 2e of the frame. The guide tube 20 is also pre-formed so that it follows the shape of the frame 2. As in the case of the guide bar 11, a clamp 12 is attached around the outer circumference of the guiding tube 20, fixed by taping, and then the clamp is anchored to the frame 2.

As is clear from the description above, according to the present invention, since the guide bar or the guide tube is attached to the wire harness that is laid along the frame with rear window glass being inserted, in order to make the wire harness follow the shape of the frame, the wire harness is positively prevented from dangling from the frame on the glass insertion side or from projecting out over the frame. As a result, at the time of inserting the glass into the frame, the wire harness will not be pinched therebetween, and the glass insertion work can be carried out smoothly and efficiently.

Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in priority Japanese Application No. HEI 10-263648 filed on Sep. 17, 1998, which is herein expressly incorporated by reference in its entirety.

What is claimed:

1. A wire harness layout arrangement for an automobile back door having a wire harness laid along a frame, the frame having arc-shaped portions around a rear window of the back door, said arrangement comprising:

at least one arc-shaped guide component provided at at least one arc-shaped portion of the frame, said guide component configured as an elongate slender bar having a cross-section smaller than a cross-section of the wire harness, said guide component configured to follow the arc-shaped portions of the frame; and a plurality of generally T-shaped clamps attached to the wire harness at linear portions of the frame, said T-shaped clamps including a base plate for engaging the wire harness and an axial portion insertable into clamp holes provided in the frame and anchorable thereat; and a connecting member encircling and directly engaging said at least one guide component and said base plate of one of said clamps at a first location to thereby connect said guide component, said one clamp and the wire harness together at said first location, and encircling and directly engaging said at least one guide component and at least one of the wire harness and said base plate of another of said clamps at a second location to thereby connect said guide component to the wire harness at said second location;

said arrangement thereby preventing the wire harness from projecting past the frame and into a glass insertion area of the door.

2. The wire harness layout arrangement for an automobile back door according to claim 1, wherein said at least one guide component is formed from an arc-shaped guide bar.

3. The wire harness layout arrangement for an automobile back door according to claim 2, wherein said arc-shaped guide bar is formed from a resin material.

4. The wire harness layout arrangement for an automobile back door according to claim 1, wherein the wire harness is laid from a roof side to a middle portion of an upper frame portion of the frame, then from the middle portion of the upper frame portion along either side frame portion to a middle portion of a lower frame portion, and, at an arc-shaped corner portion where an upper frame portion and a lower frame portion connect with a side frame portion respectively, the wire harness is forced to conform to an arc shape of the frame by the guidance of said guide component.

5. In combination with a wire harness for an automobile back door, the wire harness being laid along a frame, the frame having arc-shaped portions around a rear window of the back door, a wire harness layout arrangement comprising:

at least one arc-shaped guide component provided at at least one arc-shaped portion of the frame, said guide component configured to follow the arc-shaped portions of the frame; and at least two generally T-shaped clamps attached to the wire harness at linear portions of the frame, said T-shaped clamps each including a base plate for engaging the wire harness and an axial portion insertable into clamp holes provided in the frame and anchorable thereat; and a connecting member encircling and directly engaging said at least one guide component and said base plate of one of said clamps at a first location to thereby connect said guide component, said one clamp and the wire harness together at said first location, and encircling and directly engaging said at least one guide component and the other of said clamps at a second location to thereby connect said guide component to said other clamp and the wire harness at said second location;

said arrangement thereby preventing the wire harness from projecting past the frame and into a glass insertion area of the door.

6. The combination wire harness and layout arrangement according to claim 5, wherein said at least one guide component is formed from an arc-shaped guide bar.

7. The combination wire harness and layout arrangement according to claim 6, wherein said arc-shaped guide bar is formed from a resin material.

8. The combination wire harness and layout arrangement of claim 5, wherein a first end of said at least one arc-shaped guide component is positioned intermediate at least one of said clamps and the wire harness at said first location, and said connecting member secures said first end of said at least one arc-shaped guide component, said at least one clamp, and the wire harness together at said first location.

9. The combination wire harness and layout arrangement of claim 8, wherein a second end of said at least one arc-shaped guide component is positioned intermediate a second said clamp and the wire harness at said second location, and said connecting member secures said second end of said at least one arc-shaped guide component, said second clamp, and the wire harness together at said second location.

10. The combination wire harness and layout arrangement of claim 5, wherein a first end of said at least one arc-shaped guide component is positioned intermediate at least one of said clamps and the wire harness at said first location, and a first connecting member secures said first end of said at least one arc-shaped guide component, said at least one clamp, and the wire harness together at said first location, and a second connecting member secures said second end of said guide component directly to the wire harness without a clamp being secured to said second end.

11. A wire harness layout arrangement for an automobile back door having a wire harness laid along a frame, the frame having arc-shaped portions around a rear window of the back door, said arrangement comprising:

at least one arc-shaped guide component provided at at least one arc-shaped portion of the frame, said guide component configured to follow the arc-shaped portions of the frame; and at least one generally T-shaped clamp attached to the wire harness at linear portions of the frame, said at least one T-shaped clamp including a base plate for engaging the wire harness and an axial portion insertable into clamp holes provided in the frame and anchorable thereat; and a connecting member encircling and directly engaging said at least one guide component and said base plate of said clamp at a first location to thereby connect said guide component, said clamp and the wire harness together at said first location, and encircling and directly engaging said at least one guide component and the wire harness at a second location to thereby connect said guide component to the wire harness at said second location;

said arrangement thereby preventing the wire harness from projecting past the frame and into a glass insertion area of the door.

12. The wire harness layout arrangement for an automobile back door according to claim 11, wherein said at least one guide component is formed from an arc-shaped guide bar.

13. The wire harness layout arrangement for an automobile back door according to claim 12, wherein said arc-shaped guide bar is formed from a resin material.

14. The wire harness layout arrangement for an automobile back door according to claim 11, wherein the wire harness is laid from a roof side to a middle portion of an upper frame portion of the frame, then from the middle portion of the upper frame portion along either side frame portion to a middle portion of a lower frame portion, and, at an arc-shaped corner portion where an upper frame portion and a lower frame portion connect with a side frame portion respectively, the wire harness is forced to conform to an arc shape of the frame by the guidance of said at least one guide component.

15. The wire harness layout arrangement of claim 1, wherein said connecting member comprises tape.

16. The combination wire harness and layout arrangement of claim 5, wherein said connecting member comprises tape.

17. The wire harness layout arrangement of claim 11, wherein said connecting member comprises tape.

18. The wire harness layout arrangement of claim 1, wherein said guide component is a round rod.

19. The combination wire harness and layout arrangement of claim 5, wherein said guide component is a round rod.

20. The wire harness layout arrangement of claim 11, wherein said guide component is a round rod.

* * * * *